Oct. 23, 1962  G. A. SKOGLUND ETAL  3,060,303

HEATING ELEMENT

Filed July 29, 1958

GEORGE A. SKOGLUND
RICHARD D. WINGATE
INVENTORS

BY *Hamard E. Rackenbach*

ATTORNEY

United States Patent Office 3,060,303
Patented Oct. 23, 1962

3,060,303
HEATING ELEMENT
George A. Skoglund, Morrisville, Pa., and Richard D. Wingate, Trenton, N.J.
Filed July 29, 1958, Ser. No. 751,714
1 Claim. (Cl. 219—46)

Our invention relates to heating elements and more particularly to heating elements suitable for being energized by electricity and formed by molding conductive plastic or elastomer materials into a desired form or shape and imparting thereto a predetermined electrical and heating characteristic.

The expanding use of electricity for heating purposes has created a demand for heating elements which may be readily and economically produced in tape or sheet form and which may be so constructed as to disperse or retain predetermined amounts of heat energy as may be required. Commonly used today are systems which utilize lengthy strands of highly conductive materials such as finely drawn copper, Nichrome or other metallic wires which are continuously disposed through bulk materials such as electric blankets or conventional heating pads. Serious objections to this type of structure have arisen which renders its use uneconomical and at times dangerous. The wire for use in such structures must be carefully drawn to considerable length under the most rigid controls, and must be woven with great care through the blanket or pad in which it is used. Such wire strands may crack or break under the constant flexing of the blanket or pad, or may wear through the blanket or pad, causing damage to the pad and also creating the possibility of a disagreeable, if not dangerous, contact with the body of the person using the same.

Attempts have been made to overcome these objections by various devices. The most common expedient is to coat a fibrous base with metallic or conductive resinous materials. Resulting structures have been inadequate in that the elements thus produced do not have predetermined uniform heating capabilities; are not flexible and sufficiently elastic in nature to perform multivarious and divergent types of duties; and are subject to cracking and flaking, thus causing a progressive deterioration during the course of use of such element.

The primary object of the present invention is to provide a new and novel structure and method of manufacturing the same in the nature of a heating element, elastic and flexible in nature, economical to produce and which may be made with a predetermined heating capacity. This is achieved by molding under pressure and heat a mass of electrically conductive plastic or elastomer material into a suitable fabric tape or mat having conductive leads therein to achieve a substantial integration with the tape or mat whereby a condition approaching homogeneity is achieved between the mass of material and the tape.

Another object herein is to provide novel heating elements with different heating capacities. By varying the size of mesh and filaments comprising the fabric tape or mat, as well as by employing conductive elastomers whose electrical properties may be controllably varied, this object may be implemented.

Still another object of this invention is to provide for the continuous production of elements useful in heating applications, which may be cut to desired lengths after fabrication without varying their quantitative heating characteristics, making for a highly economic production procedure.

These and many other objects and purposes of our invention may be readily perceived from the following description thereof in which reference is made to the figures of the accompanying drawings, wherein.

Figure 1:
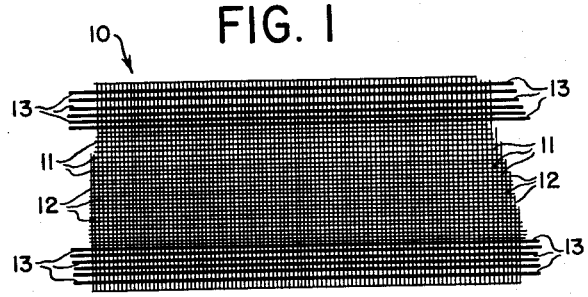
FIG. 1 is a top view of an appropriate tape for use in making our novel heating element.
Figure 5:
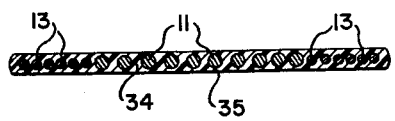
FIG. 5 is a section at 5—5 of FIG. 4.

In FIG. 1 of the drawings, is shown an appropriate fabric base generally designated 10, which is in the nature of a tape of woven strands, there being warp strands 11 and weft strands 12. The strands comprising such tape are of suitable dielectric material, preferably of a non-organic nature such as fiber glass, glass wool, rock wool, asbestos or other similar materials which may be provided in filament form and fabricated into a textile-like product. Disposed along the tape 10 are thin strips of highly conductive material 13 which may be, as is shown, of wire or any other suitable conductor. This highly conductive material may be interwoven in place of the warp threads as shown in FIGS. 1 and 5 of the drawings. However, means other than interweaving of achieving a relatively high conductive area may be used, and as so modified the tape could still be used in the practice of our invention.

We have found that we can alter the heat dispersing characteristics in our completed heating elements in a predetermined manner by varying either or both the fineness of weave in the fabric base, and/or the thickness of the woven strands 11 and 12 themselves. We can also vary the electrical characteristics in the finished heating element by varying the numbers, shapes and sizes of the metallic conductors incorporated into the fabric base. We can also provide for a great variety of applications of our completed heating element by altering the type of weave in the fabric base so that, for example, the element may be stretchable.

A fabric base having conductors therein as shown in FIG. 1, then, is the starting point in the fabrication of a heating element according to our invention. By treating such fabric base 10 in a manner best understood by reference to FIGS. 2 or 3 of the drawings, novel heating elements according to our invention may be produced. Prior to application to the basic tape 10, a mixture of conductive plastic or elastomer and an appropriate solvent is made in the mixing tank 16 shown in FIG. 2. The electrical characteristics of the finished heating element may be varied by using both conductive and non-conductive plastic, or elastomeric material in the mix, and varying the ratio of such conductive and non-conductive elastomers. By such variation, the electrical resistivity of finished heating elements may be varied, from 5 ohm-cm. to $1 \times 10^{16}$ ohm-cm. Any type of suitable mixing tank or ball mill may be used at 16 which will serve to create a homogeneous mixture of the conductive plastic or elastomer and the solvent. We prefer that a sealed tank be used at 16 so that evaporation of the solvent from the tank will be reduced to a minimum and the mix there made will be of a constant viscosity when it is applied to the base tape. The mixture is worked in the mixing tank until it is in the form of a more or less viscous paste. Such paste is then applied to the fabric base tape 10 at 17.

The impregnated tape is then fed or drawn between the stationary rolls 20 and 21, through the controlled opening 22 provided therebetween. The opening 22 may be adjusted to desired width so that the tape 10 and the mix applied thereto can be maintained at a predetermined thickness. The rolls 20 and 21 serve to force the mixture to fill completely the openings defined by the warp and weft threads in the fabric of the tape. We prefer that the mixture be applied to the tape on both sides thereof to insure impregnation of the tape with the mixture. The rolls serve further to remove any excess mix beyond that necessary to achieve the predetermined thickness. Of course, such rolls may be replaced by scraper or doctor blades, or other suitable means for removing excess elastomer mix and forcing the mixture into the fabric.

The impregnated tape is then drawn into a heating chamber 23 where it is exposed to heat, as from a radiant heat source, for a period of time sufficient to allow the solvent to be evaporated from the mix. We prefer to use radiant heat, though of course other heating techniques may be employed.

The impregnated tape is then pre-cured or vulcanized at elevated temperature under pressure. To pre-cure said tape, it is drawn into the hydraulic press designated generally 24 in FIG. 2 and pressed between the platens 25 and 26 thereof at elevated temperature under a predetermined pressure. This step of pre-curing or vulcanizing the impregnated tape under pressure and heat insures an absolute uniformity in the finished product as to electrical and heating characteristics and enables the provision of an element with these characteristics predetermined. In the pre-curing step the ratio of time, temperature and pressure is determined by the physical and electrical characteristics desired in the completed element.

The pre-cured coated tape is then passed into an aerated heating chamber 27 for final curing to achieve stabilization of the electrical properties of the element. The conditions for the final cure will depend upon the thickness of the element, but in general the temperature for the final cure will be in the approximate range 350° F.–900° F., and the duration of this cure would be approximately six hours. In such chamber 27 the path of the tape may be extended by disposing a plurality of rolls 28 over and between which the tape will pass. The stabilized heating element then emerges from the heating chamber 27 and is rolled into a coil for storage at 29.

Figure 3:
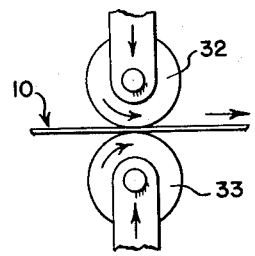
FIG. 3 represents alternative apparatus suitable for use in the step of curing, which may be appropriately substituted in the sequential representation of FIG. 2.
Figure 2:
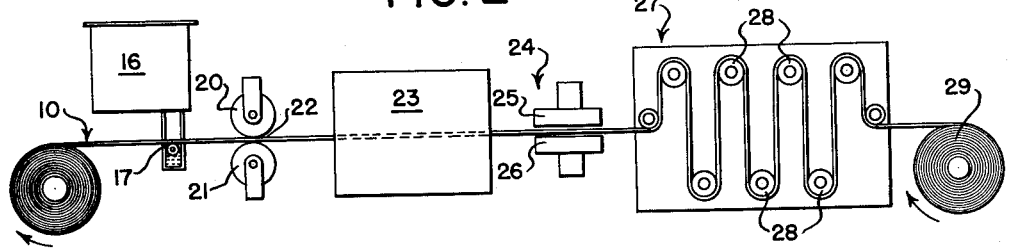
FIG. 2 is a schematic representation of apparatus sequentially arranged, suitable for use in producing our novel heating element.

In FIG. 3 are shown elements which may replace the hydraulic press 24 described in connection with FIG. 2. Thus, such replacement expedient consists of a pair of rollers 32 and 33. Upon emergence from the heating chamber 23, then, the coated tape would pass for curing between said rollers 32 and 33 which are heated to a suitable temperature and which are capable of exerting a substantial pressure against the coated tape which passes therebetween. The heat and pressure used will depend upon the speed of the operation desired and the character of the material being used. By employing the rollers shown in FIG. 3, it is apparent that a continuous, rather than an intermittent method is available for production of our novel heating element.

*Example*

It was desired to manufacture a heating element according to our invention having a width of one-half inch, a thickness of 0.004 inch, and a capability of dispersing 10 watts of heat energy per square inch at a 70° ambient room temperature. A 0.003 inch thick fiberglass tape of plain weave was used, which tape furnishes a multiple of mold areas defined by the warp and weft threads in the fabric base. Along the selvages in the fabric base tape at either side were interwoven six 0.006 inch copper wires flattened to 0.001 inch final thickness. The paste applied to the tape consisted entirely of electrically conductive silicone rubber with toluene as solvent. The temperature in the heating chamber 23, where evaporation of the solvent occurred, was 135° F., obtained by employing radiant heating means, evaporation being satisfactorily completed in ten minutes. In pre-curing, the conditions in the hydraulic press 24 were that the platens were at a temperature of 360° F. and a pressure of 100 pounds per square inch was exerted, and the precuring was accomplished instantaneously. With these conditions, a final heating element having the enumerated characteristics was produced.

Figure 4:
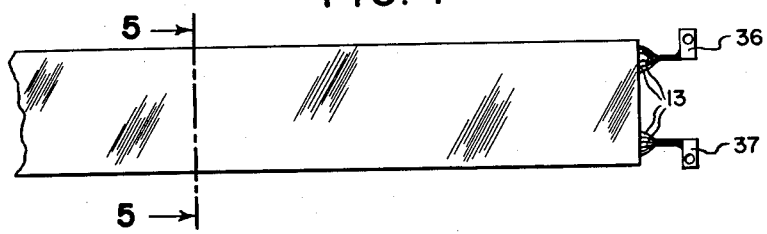
FIG. 4 is a top view of a heating element constructed according to our invention with terminals mounted for use.

A finished heating element according to our invention is best seen in FIGS. 4 and 5 of our drawings. It will be seen that it is generally composed of masses 34 of electrically conductive plastic or elastomeric material integrated into a single structure with a fabric base tape, the conductive material completely filling the spaces between the warp threads 11 and weft threads 12 in the fabric base and the masses of conductive material within each area defined by a warp and weft thread being interconnected by a thin layer 35 of conductive material with all other such masses, such thin layer of conductive material encompassing as well the metallic conductors 13 within the heating element. It will be noted that the areas containing the series of metallic conductors do not make electrical contact with each other, but rather the circuit between them is completed by the conductive elastomer therebetween, so that in effect heating is achieved uniformly across the surface of the completed heating element with the circuit being in the nature in an infinite parallel setup. It will be apparent that after production, stabilized coated tape may be cut to any suitable length and terminals, as 36 and 37 in FIG. 4, mounted at appropriate locations on the conductors 13 so that an electric current may be introduced to the element to activate it.

These and other forms of our invention will be readily apparent from what has been disclosed above, and it is not our intention that the scope of our invention as claimed be limited by the particular illustrations or specific embodiments described above.

We claim:

A resistor comprising a reticulated flexible dielectric matrix of a thickness of the order of 0.003 inch, said matrix being constituted of woven strands providing uniform interstices therebetween, a plurality of spaced metal filaments of a thickness in the order of 0.001 inch in non-electrical contact with each other interwoven in said matrix adjacent the lengthwise edges thereof and being inwardly spaced from said edges, a homogeneous, electrically conductive, compacted silicone rubber integrating said matrix and said filaments and completely filling said interstices on a single plane, said conductive silicone rubber being compacted by the application of heat in a range of 900° F. and the application of pressure above 100 pounds per square inch, said conductive silicone rubber being a uniform non-porous high density mass whereby a predetermined homogeneous diffusion of electrical energy within the entire magnitude of said resistor is attained.

References Cited in the file of this patent

UNITED STATES PATENTS

| | | |
|---|---|---|
| 1,747,649 | Ruben | Feb. 18, 1930 |
| 1,963,554 | McDill | June 19, 1934 |
| 1,989,282 | Kimble et al. | Jan. 29, 1935 |
| 2,255,376 | Bull et al. | Sept. 9, 1941 |
| 2,274,840 | Marick et al. | Mar. 3, 1942 |
| 2,386,095 | Edgar et al. | Oct. 2, 1945 |
| 2,406,367 | Griffith et al. | Aug. 27, 1946 |
| 2,473,183 | Watson | June 14, 1949 |
| 2,503,457 | Speir et al. | Apr. 11, 1950 |
| 2,559,077 | Johnson et al. | July 3, 1951 |
| 2,669,646 | Ford | Feb. 16, 1954 |
| 2,679,569 | Hall | May 25, 1954 |
| 2,683,673 | Silversher | July 13, 1954 |
| 2,721,154 | Hopf et al. | Oct. 18, 1955 |

FOREIGN PATENTS

| | | |
|---|---|---|
| 580,748 | Canada | Aug. 4, 1959 |